United States Patent
Doi et al.

[11] 3,961,845
[45] June 8, 1976

[54] ZOOM LENS SYSTEM

[75] Inventors: Yoshikazu Doi; Yutaka Sakai; Kenzo Sado, all of Omiya, Japan

[73] Assignee: Fuji Photo Optical Co., Ltd., Omiya, Japan

[22] Filed: July 14, 1975

[21] Appl. No.: 595,885

Related U.S. Application Data

[63] Continuation-in-part of Ser. No. 426,139, Dec. 19, 1973, abandoned.

[30] Foreign Application Priority Data
Aug. 17, 1973 Japan.................................. 48-92113

[52] U.S. Cl.................................. 350/184; 350/186
[51] Int. Cl.²............................................ G02B 15/00
[58] Field of Search............................ 350/184, 186

[56] References Cited
UNITED STATES PATENTS

| | | |
|---|---|---|
| 3,164,664 | 1/1965 | Cook .................................. 350/184 |
| 3,393,958 | 7/1968 | Takano................................ 350/184 |
| 3,840,290 | 10/1974 | Betensky............................. 350/184 |

*Primary Examiner*—John K. Corbin
*Assistant Examiner*—Conrad Clark

[57] ABSTRACT

In a zoom lens system dividable into a zooming lens component which varies the magnification without moving the image plane and a relay lens component, at least a part of the relay lens component is made to have no power so that the axial movement thereof may not vary the focal length of the zoom lens system and is moved along the optical axis in association with the zooming lens component to compensate the fluctuation of aberration caused by the movement of the zooming lens component.

11 Claims, 7 Drawing Figures

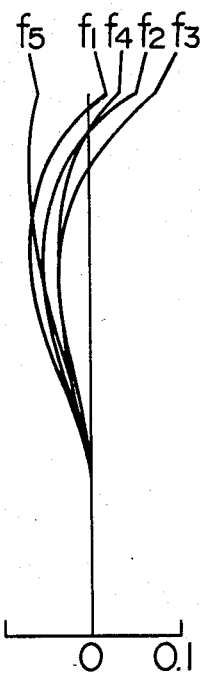
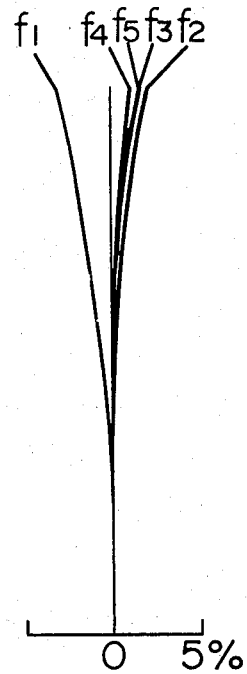
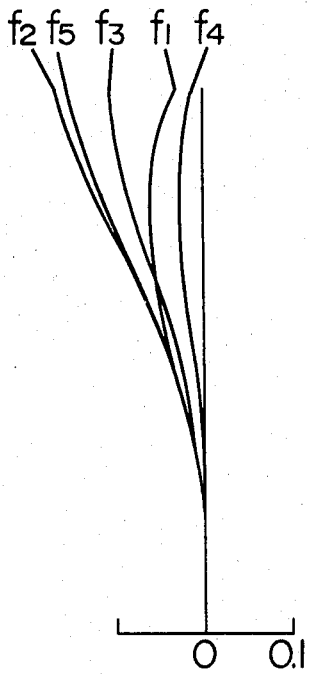
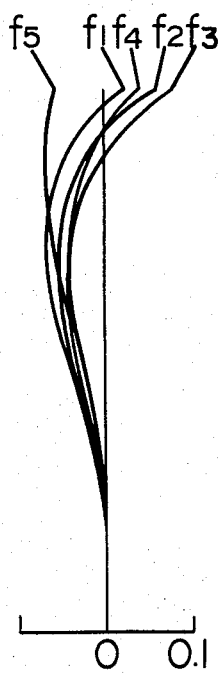
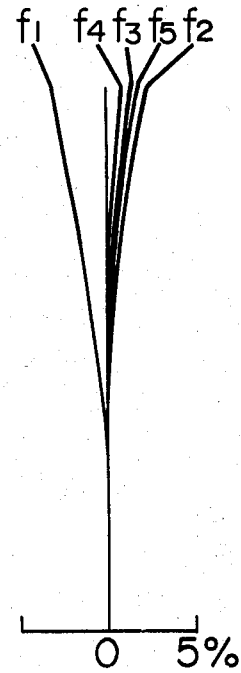
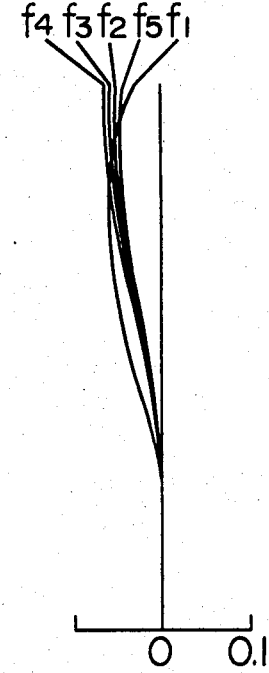

ZOOM LENS SYSTEM

This application is a continuation-in-part of U.S. Ser. No. 426,139 filed Dec. 19, 1973 now abandoned.

BACKGROUND OF THE INVENTION

1. Field of the Invention

This invention relates to a zoom lens system, and more particularly to a zoom lens system in which the fluctuation of aberration caused by the movement of the zooming lens component accompanying the zooming operation is independently compensated.

2. Description of the Prior Art

In a zoom lens system, it is required to sufficiently compensate or correct the aberration over the whole range of zooming. In order to correct the aberration, it has generally been proposed to divide the lens system into two groups, one of which compensates the fluctuation of the aberration caused by the zooming operation and the other of which corrects the aberration on the focussing plane which determines the quality of the focussed image. The lens system in which the fluctuation of aberration caused by the zooming operation is to be compensated is divided into a focussing lens component, a variator lens component, and a compensator lens component. It is, therefore, necessary that the lens system should be so formed that the fluctuation of aberrations including spherical aberration, coma, astigmatism, distortion, longitudinal chromatic aberration and lateral chromatic aberration may all be compensated by the three lens components. However, it is very difficult or actually impossible to completely correct these aberrations by use of the three lens components.

Taking the focussing lens component for instance, the amount of the spherical aberration produced thereby varies at a ratio three times as large as the ratio of zooming, assuming that the brightness does not vary between the extremities of the range of zooming. The position of the entrance pupil changes along with the zooming operation and is generally separated from the focussing lens component since the stop is positioned behind the zooming lens component. Accordingly, the amount of the distortion, astigmatism and lateral chromatic aberration becomes large and complicatedly varies over the range of zooming. Under such circumstances, the aberrations produced by the focussing lens component are mainly corrected by the variator lens component. However, on the other hand, the aberrations produced by the variator lens component also vary complicatedly over the range of zooming because the variator lens component also moves along the optical axis for varying the focal length.

Therefore, it is impossible to completely correct the fluctuation of all the aberrations over the whole range of the zooming operation. Accordingly, in the actual zoom lens system, various aberrations are generally reduced to be smaller than an allowable predetermined small range to obtain an image of as high quality as possible. The range which must be accepted as allowable becomes inevitably larger as greater demands are put on the zoom lens regarding various performance factors. In the actually manufactured zoom lenses, therefore, it often happens that the finally obtained image, in which the various aberrations are limited to their minimum by use of the highest level of optical design engineering available, still suffers from the remaining aberration which exceeds the practically allowable limit.

The fluctuation of the aberration is considerably complicated, since a number of kinds of aberrations fluctuate in the course of the zooming operation and the diameter of the off-axis luminous flux changes together with the zooming and focussing operations, and further the fluctuation of aberration caused in the focussing lens component by the variation in the distance of the subject varies together with the zooming operation.

SUMMARY OF THE INVENTION

In view of the above-described defects and problems inherent in the conventional zoom lens system, it is the primary object of the present invention to provide a zoom lens system in which the fluctuation of aberration caused by the axial movement of the zooming lens component is effectively compensated.

In order to accomplish the above object of the invention, the inventors of this invention studied and made use of the following aspects and phenomena of the zoom lens system. Since the aperture of the zoom lens system is generally positioned immediately behind the zooming lens component as mentioned hereinbefore, the amount of aberration to be corrected by a relay lens component is constant within the range of the zooming operation and the fluctuation of aberration made in the zooming lens component appears as it is on the focussing plane. Further, in order to effectively correct the curvature of field, distortion and lateral chromatic aberration, it is preferred to use a lens component the principal ray of which is apart from the optical axis, that is to say, a lens component which is apart from the aperture as far as possible. This is because the correction effect for said kinds of aberration increases as the lens component for correcting the aberration moves away from the aperture. On the other hand, for the other kinds of aberration the correction effect decreases as the lens component for correcting the aberration moves closer to the focal plane.

In view of the above, the inventors found that the fluctuation of aberrations caused by zooming operation accompanied by the axial movement of the zooming lens component could be compensated by moving a part or the whole of a relay lens component along the optical axis in association with the movement of the zooming lens component to control the degree of correction of aberration by the relay lens component.

Therefore, in this invention, a zoom lens system is divided into a zooming lens component comprising a focussing lens component, a variator lens component and a compensator lens component, and a relay lens component, and at least a part of the relay lens component is made to have no power and moved along the optical axis in association with the movement of the variator lens component.

Since the fluctuation of aberrations caused by the zooming operation can be compensated by a part of the relay lens component, the design of the zooming lens component is facilitated and accordingly the performance of the zoom lens system is further enhanced. Thus, it becomes possible to design a zoom lens system of high performance having a wide visual angle, a large zooming ratio and small size in accordance with the present invention.

The phrase "no-power" means that the focal length of the lens is substantially indefinite. Since the power of the movable lens in the relay lens system is limited to zero, aberrations in the central part of the image such as spherical aberration and longitudinal chromatic aberration are not corrected but those in the marginal part of the image are corrected, as will be readily understood from the description. Further, the performances of the lens system such as focal length, back focal distance, the magnification and the position of pupil, are not varied by the movement of the no-power lens component.

Further, since the power of the movable lens is limited to zero, it is not always necessary to locate the movable lens component in parallel rays between two lens components. Therefore, the movable lens can be located at any position in the relay lens system.

The above and other objects, features and advantages of the present invention will be apparent from the following detailed description of the preferred embodiment thereof taken in conjunction with the accompanying drawing as briefly described hereinbelow.

BRIEF DESCRIPTION OF THE DRAWING

FIGS. 2A, 2B and 2C illustrate graphs of spherical aberration, distortion and curvature of field of the conventional zoom lens system, and FIGS. 3A, 3B and 3C illustrate graphs of spherical aberration, distortion and curvature of field of the zoom lens system in accordance with the present invention.

DESCRIPTION OF THE PREFERRED EMBODIMENT

Figure 1:
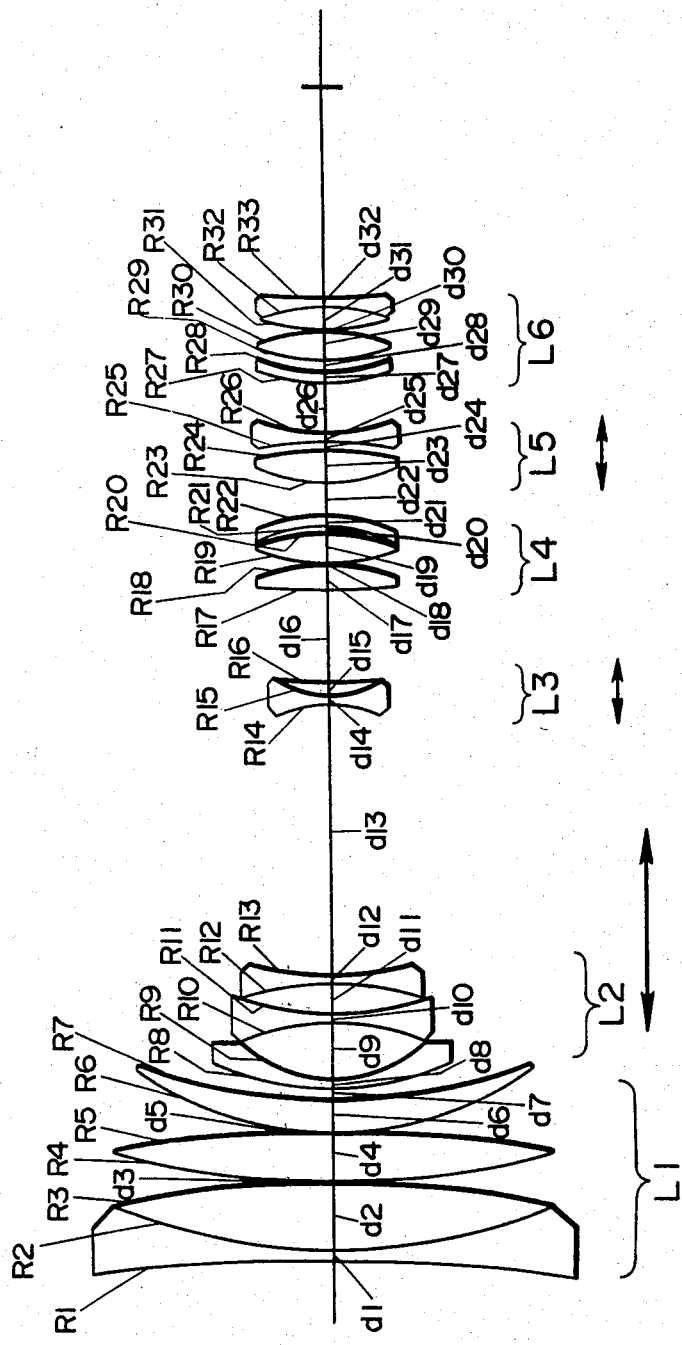
FIG. 1 is a longitudinal sectional view of the zoom lens system having a relay lens component in accordance with the present invention.

Referring to FIG. 1 showing an embodiment of the zoom lens system in accordance with the present invention, the zoom lens system comprises a zooming lens component L1, L2 and L3 and a relay lens component L4, L5 and L6. The relay lens component includes a non-power movable lens component L5 which is axially moved. The zooming lens component consists of a focussing lens component L1, a variator lens component L2 and a compensator lens component L3. In the zooming operation, the variator lens component L2 and the compensator lens component L3 are axially moved to vary the focal length without moving the image plane. Said non-power movable lens component L5 is axially moved in association with the variator lens component L2 and/or the compensator lens component L3 in the course of the zooming operation. In this invention, particularly the curvature of field is corrected.

In the embodiment shown in FIG. 1, an aperture stop is positioned between the compensator lens component L3 and the first relay lens component L4. The zooming lens component L1, L2 and L3 and the first relay lens component L4 constitute an afocal lens system. The second relay lens component L5 is a practically non-power lens component and movable between the first relay lens component L4 and the third relay lens component L6. The third relay lens component L6 is a convergent lens component which finally focuses the image on the focal plane. Since the second relay lens component L5 is a non-power lens moved, the movement of the second non-power lens component L5 does not at all affect the focal length, f-number, spherical aberration or longitudinal chromatic aberration. However, since the off-axis rays are skewly incident to the second non-power relay lens component L5, the height of the off-axis rays incident to the non-power lens component L5 is varied by moving the lens L5 along the optical axis thus varying the amount of curvature of field by an amount proportional to the length of the movement thereof. Further, the movement of the second relay lens component L5 hardly influences the distortion since the second relay lens component L5 moves in the vicinity of the aperture stop. The above features are clearly shown in Table III which indicates the variation in Seidel sums of the zoom lens system of the present invention. The zoom lens of this invention shown in FIG. 1 varies its focal length from 7.5 to 75mm and its visual field from 51° to 5.4°. The f-number of this lens at one extremity of the range of zooming operation is twice as large as that at the other extremity. This embodiment of the zoom lens system in accordance with this invention satisfies the conditions as shown in the following Table I.

Table I

| | | | | |
|---|---|---|---|---|
| R 1 = | −263.158 | d 1 = | 1.3 | N 1 = 1.7618 |
| R 2 = | 63.091 | d 2 = | 7.02 | N 2 = 1.5725 |
| R 3 = | −133.333 | d 3 = | 0.2 | |
| R 4 = | 76.336 | d 4 = | 4.62 | N 3 = 1.6935 |
| R 5 = | −256.41 | d 5 = | 0.2 | |
| R 6 = | 36.496 | d 6 = | 3.15 | N 4 = 1.6935 |
| R 7 = | 58.824 | d 7 = | 1.067 | |
| R 8 = | 28.986 | d 8 = | 1.0 | N 5 = 1.6935 |
| R 9 = | 14.245 | d 9 = | 6.0 | |
| R10 = | −29.586 | d10 = | 0.8 | N 6 = 1.6935 |
| R11 = | 29.586 | d11 = | 2.8 | N 7 = 1.7847 |
| R12 = | −51.282 | d12 = | 0.8 | N 8 = 1.6935 |
| R13 = | 44.944 | d13 = | 27.82 | |
| R14 = | −14.903 | d14 = | 0.8 | N 9 = 1.6935 |
| R15 = | 12.107 | d15 = | 1.64 | N10 = 1.7847 |
| R16 = | 81.633 | d16 = | 9.631 | |
| R17 = | 337.268 | d17 = | 2.4 | N11 = 1.5163 |
| R18 = | −23.627 | d18 = | 0.2 | |
| R19 = | 39.093 | d19 = | 2.4 | N12 = 1.5163 |
| R20 = | −49.963 | d20 = | 1.0 | |
| R21 = | −21.115 | d21 = | 1.0 | N13 = 1.7400 |
| R22 = | −30.626 | d22 = | 3.5 | |
| R23 = | 16.793 | d23 = | 3.0 | N14 = 1.5163 |
| R24 = | −74.349 | d24 = | 1.2 | |
| R25 = | −41.667 | d25 = | 1.0 | N15 = 1.7495 |
| R26 = | 31.223 | d26 = | 5.0 | |
| R27 = | 25.214 | d27 = | 1.0 | N16 = 1.7408 |
| R28 = | 16.851 | d28 = | 1.25 | |
| R29 = | 27.647 | d29 = | 3.0 | N17 = 1.5163 |
| R30 = | −21.801 | d30 = | 0.2 | |
| R31 = | 20.282 | d31 = | 2.4 | N18 = 1.5163 |
| R32 = | −25.006 | d32 = | 1.0 | N19 = 1.7440 |

Table I-continued

R33 = 182.273 where
- R with a numerical subscript indicates the radius of curvature of a surface identified by the subscript and shown in the drawing, FIG. 1;
- d with a numerical subscript indicates the thickness of a lens or the distance of the air space along the optical axis identified by the subscript and shown in FIG. 1; and
- N with a numerical subscript indicates the refractive index of a lens element identified by the subscript and numbered consecutively from the front to the rear being measured with the d-line of helium.

The variation in Seidel sums of the zoom lens system is shown in Table III, in which the Seidel sums with respect to the relay lens components L5 and L6 are shown under the conditions of $f_1$ of Table II with the distances between lenses d22 and d26 changed to 1.5 and 7.0, and to 7.0 and 1.5, and with the dimensions being 1/20 smaller than those shown in Table I. The Seidel sums shown under the reference character A in the first table in Table III are for the conditions where $d22=1.5$ and $d26=7.0$ and those shown under B in the second Table III are for the conditions where $d22=7.0$ and $d26=1.5$.

The movement of the lens components is shown in the following Table II.

Table II

|  | $f_1$ | $f_2$ | $f_3$ | $f_4$ | $f_5$ |
|---|---|---|---|---|---|
| d 7 = | 1.067 | 15.64 | 22.651 | 28.99 | 31.48 |
| d13 = | 27.82 | 12.643 | 6.157 | 2.707 | 3.506 |
| d16 = | 9.631 | 10.237 | 9.71 | 6.823 | 3.532 |
| d22 = | 3.5 | 1.78 | 2.76 | 4.28 | 1.88 |
| d26 = | 5.0 | 6.72 | 5.74 | 4.22 | 6.62 |

The Seidel sums at the lens components L5 and L6 are as shown in the following Table III, where
- I = Seidel sum of spherical aberration;
- II = Seidel sum of coma;
- III = Seidel sum of astigmatism;
- IV = Seidel sum of curvature of field; and
- V = Seidel sum of distortion.

Table III

| A | $I_A$ | $II_A$ | $III_A$ | $IV_A$ | $V_A$ |
|---|---|---|---|---|---|
| 23 | 74.625 | 6.806 | 0.621 | 1.026 | 0.094 |
| 24 | 87.944 | −3.293 | 0.123 | 0.215 | −0.008 |
| 25 | −147.372 | 3.555 | −0.086 | −0.291 | 0.007 |
| 26 | −7.673 | −1.455 | −0.276 | −0.550 | −0.104 |
| 27 | 14.544 | 2.825 | 0.549 | 0.886 | 0.172 |
| 28 | −114.984 | −16.773 | −2.447 | −2.952 | −0.431 |
| 29 | 38.074 | 6.804 | 1.216 | 1.462 | 0.261 |
| 30 | 134.710 | 4.505 | 0.151 | 0.463 | 0.015 |
| 31 | −1.963 | −0.642 | −0.210 | 0.126 | 0.041 |
| 32 | −83.794 | −4.874 | −0.284 | −0.352 | −0.021 |
| 33 | 30.268 | −1.022 | 0.034 | −0.012 | 0.0 |
| TA | 24.378 | −3.565 | −0.608 | 0.020 | 0.028 |
| B | $I_B$ | $II_B$ | $III_B$ | $IV_B$ | $V_B$ |
| 23 | 74.625 | 8.271 | 0.917 | 1.322 | 0.147 |
| 24 | 87.944 | −1.566 | 0.028 | 0.119 | −0.002 |
| 25 | −147.372 | 0.660 | −0.003 | −0.209 | 0.001 |
| 26 | −7.673 | −1.606 | −0.336 | −0.611 | −0.128 |
| 27 | 14.544 | 2.743 | 0.517 | 0.855 | 0.161 |
| 28 | −114.984 | −16.130 | −2.263 | −2.768 | −0.388 |
| 29 | 38.074 | 6.592 | 1.141 | 1.388 | 0.240 |
| 30 | 134.710 | 3.752 | 0.104 | 0.417 | 0.012 |
| 31 | −1.963 | −0.631 | −0.203 | 0.133 | 0.043 |
| 32 | −83.794 | −4.406 | −0.232 | −0.301 | −0.016 |
| 33 | 30.268 | −1.191 | 0.047 | 0.0 | 0.0 |
| TB | 24.378 | −3.511 | −0.282 | 0.347 | 0.069 |
|  | I | II | III | IV | V |
| TB−TA | 0.0 | 0.054 | 0.326 | 0.326 | 0.042 |

As shown in Table III in the third table thereof, when the movable second relay lens component L5 is moved rearward along the optical axis by 5.5, the Seidel sum of spherical aberration I does not change. The Seidel sum of astigmatism III and that of curvature of field of saggital image surface IV change by comparatively large amounts with respect to the other Seidel sums such as of coma II and distortion V. Therefore, it is possible to reduce the fluctuation of the astigmatism accompanying the zooming operation by moving the second relay lens component L5 in the direction to offset the fluctuation of the aberration in association with the zooming operation.

The actual fluctuation of aberrations are shown in the graphs of FIGS. 2A, 2B, C, 3A, 3B and 3C. FIGS. 2A, 2B and 2C show the aberrations of the conventional zoom lens system in which the spaces on both sides of the second relay lens L5 are fixed. FIG. 2A shows the spherical aberration, FIG. 2B shows distortion and FIG. 2C shows curvature of field. The aberrations of the zoom lens system in accordance with the present invention are shown in FIGS. 3A, 3B and 3C which respectively show spherical aberration, distortion and curvature of field. The reference characters $f_1$ to $f_5$ indicate the conditions of the lens system as identified in Table II. As clearly shown in FIG. 3C with reference to FIG. 2C, the curvature of field is markedly corrected by the zoom lens system in accordance with the present invention. The deviation of the focal plane caused by the fluctuation of the spherical aberration can be compensated by properly moving the compensator lens component L3 of the zooming lens component.

Although in the above described embodiment of the present invention the fluctuation of aberration is compensated by moving the middle part of the relay lens component, it will be understood by a person skilled in the art that the same result can be obtained whatever part of the relay lens component may be made to have no power and moved. Further, it will be readily understood that the fluctuation of the chromatic aberration can also be compensated by controlling the achromatic performance of the movable relay lens component.

What is claimed is:

1. A zoom lens system comprising a zooming lens component and a relay lens component wherein said relay lens component includes a movable lens component of no power which is moved along the optical axis thereof to compensate the fluctuation of aberration of the zoom lens system caused by the axial movement of the zooming lens component accompanying the zooming operation.

2. A zoom lens system as defined in claim 1 wherein said zooming lens component comprises a focussing lens component, a variator lens component and a compensator lens component arranged in this order along the optical axis thereof, and a part of said relay lens component is moved along the optical axis in association with the movement of said zooming lens component.

3. A zoom lens system as defined in claim 1 wherein said zooming lens component comprises a focussing lens component, a variator lens component and a compensator lens component arranged in this order along the optical axis thereof, and said relay lens component comprises at least one fixed relay lens component and at least one movable relay lens component of no power arranged along the optical axis behind said compensator lens component, and said movable relay lens component is moved in association with said zooming lens component.

4. A zoom lens system as defined in claim 3 wherein said zooming lens component and said fixed relay lens component constitute an afocal lens system, whereby said movable relay lens component is moved in parallel rays.

5. A zoom lens system as defined in claim 1 wherein said zooming lens component comprises a focussing lens component, a variator lens component and a compensator lens component arranged in this order along the optical axis thereof, and a part of said relay lens component is moved along the optical axis in association with the movement of said variator lens component.

6. A zoom lens system as defined in claim 3 wherein said relay lens component comprises a first fixed relay lens component, a movable relay lens component of no power and a second fixed relay lens component arranged in this order along the optical axis behind said compensator lens component, and said movable relay lens component is moved in association with said variator lens component.

7. A zoom lens system as defined in claim 1 wherein said zooming lens component comprises a focussing lens component, a variator lens component and a compensator lens component arranged in this order along the optical axis thereof, and a part of said relay lens component is moved along the optical axis in association with the movement of said compensator lens component.

8. A zoom lens system as defined in claim 7 wherein said relay lens component comprises a first fixed relay lens component, a movable relay lens component of no power and a second fixed relay lens component arranged in this order along the optical axis behind said compensator lens component, and said movable relay lens component is moved in association with said compensator lens component.

9. A zoom lens system as defined in claim 1 wherein said zooming lens component comprises a focussing lens component, a variator lens component and a compensator lens component arranged in this order along the optical axis thereof, and said relay lens component as a whole is moved along the optical axis in association with the movement of said variator lens component.

10. A zoom lens system comprising six lens components having a common optical axis and arranged in order,
  a focussing lens component,
  a variator lens component movable along the optical axis for varying the focal length of the lens system,
  a compensator lens component movable along the optical axis in association with the variator lens component,
  a first relay lens component of positive power,
  a second relay lens component of no power movable along the optical axis in association with the variator lens component, and
  a third relay lens component of positive power,
  said first and third relay lens components being fixed and said second relay lens being moved therebetween.

11. A zoom lens system as defined in claim 10 wherein said lens components satisfies the following conditions:

| | | | | |
|---|---|---|---|---|
| R 1 = | −263.158 | d 1 = | 1.3 | N 1 = 1.7618 |
| R 2 = | 63.091 | d 2 = | 7.02 | N 2 = 1.5725 |
| R 3 = | −133.333 | d 3 = | 0.2 | |
| R 4 = | 76.336 | d 4 = | 4.62 | N 3 = 1.6935 |
| R 5 = | −256.41 | d 5 = | 0.2 | |
| R 6 = | 36.496 | d 6 = | 3.15 | N 4 = 1.6935 |
| R 7 = | 58.824 | d 7 = | 1.067 | |
| R 8 = | 28.986 | d 8 = | 1.0 | N 5 = 1.6935 |
| R 9 = | 14.245 | d 9 = | 6.0 | |
| R10 = | −29.586 | d10 = | 0.8 | N 6 = 1.6935 |
| R11 = | 29.586 | d11 = | 2.8 | N 7 = 1.7847 |
| R12 = | −51.282 | d12 = | 0.8 | N 8 = 1.6935 |
| R13 = | 44.944 | d13 = | 27.82 | |
| R14 = | −14.903 | d14 = | 0.8 | N 9 = 1.6935 |
| R15 = | 12.107 | d15 = | 1.64 | N10 = 1.7847 |
| R16 = | 81.633 | d16 = | 9.631 | |
| R17 = | 337.268 | d17 = | 2.4 | N11 = 1.5163 |
| R18 = | −23.627 | d18 = | 0.2 | |
| R19 = | 39.093 | d19 = | 2.4 | N12 = 1.5163 |
| R20 = | −49.963 | d20 = | 1.0 | |
| R21 = | −21.115 | d21 = | 1.0 | N13 = 1.7400 |
| R22 = | −30.626 | d22 = | 3.5 | |
| R23 = | 1.793 | d23 = | 3.0 | N14 = 1.5163 |
| R24 = | −74.349 | d24 = | 1.2 | |
| R25 = | −41.667 | d25 = | 1.0 | N15 = 1.7495 |
| R26 = | 31.223 | d26 = | 5.0 | |
| R27 = | 25.214 | d27 = | 1.0 | N16 = 1.7408 |
| R28 = | 16.851 | d28 = | 1.25 | |
| R29 = | 27.647 | d29 = | 3.0 | N17 = 1.5163 |
| R30 = | −21.801 | d30 = | 0.2 | |
| R31 = | 20.282 | d31 = | 2.4 | N18 = 1.5163 |
| R32 = | −25.006 | d32 = | 1.0 | N19 = 1.7440 |
| R33 = | 182.273 | | | | where
R with a numerical subscript indicates the radius of curvature of a surface identified by the subscript;
d with a numerical subscript indicates the thickness of a lens or the distance of the air space along the optical axis identified by the subscript; and
N with a numerical subscript indicates the refractive index of a lens element identified by the subscript and numbered consecutively from the front to the rear being measured with the d-line of helium.

* * * * *